(12) United States Patent
Berling

(10) Patent No.: US 12,228,140 B2
(45) Date of Patent: Feb. 18, 2025

(54) IMPELLER RECEPTACLE

(71) Applicant: CASO HOLDING GMBH, Arnsberg (DE)

(72) Inventor: Udo Berling, Hopsten (DE)

(73) Assignee: Caso Holding GmbH, Arnsberg (DE)

( * ) Notice: Subject to any disclaimer, the term of this patent is extended or adjusted under 35 U.S.C. 154(b) by 0 days.

(21) Appl. No.: 17/781,598

(22) PCT Filed: Dec. 1, 2020

(86) PCT No.: PCT/EP2020/084141
§ 371 (c)(1),
(2) Date: Jun. 1, 2022

(87) PCT Pub. No.: WO2021/110687
PCT Pub. Date: Jun. 10, 2021

(65) Prior Publication Data
US 2023/0193918 A1 Jun. 22, 2023

(30) Foreign Application Priority Data

Dec. 2, 2019 (DE) .......................... 102019132607.9

(51) Int. Cl.
*F04D 29/26* (2006.01)
*F04D 29/62* (2006.01)
(Continued)

(52) U.S. Cl.
CPC ......... *F04D 29/263* (2013.01); *F04D 29/626* (2013.01); *F16D 1/08* (2013.01); *F16D 1/116* (2013.01); *F24C 15/20* (2013.01)

(58) Field of Classification Search
CPC .... F04D 29/263; F04D 29/601; F04D 29/626; F04D 29/646; F16D 1/0894; F16D 1/116; F24C 15/20
See application file for complete search history.

(56) References Cited

U.S. PATENT DOCUMENTS 7,419,464 B2  9/2008  Matusima

FOREIGN PATENT DOCUMENTS

| CN | 110006082 A | * | 7/2019 |
| DE | 7927313 U1 | | 3/1981 |

(Continued)

OTHER PUBLICATIONS

Machine translation of WO 2019210975, Berling, Udo, published Nov. 7, 2019 (Year: 2019).*

(Continued)

*Primary Examiner* — David E Sosnowski
*Assistant Examiner* — Jason G Davis
(74) *Attorney, Agent, or Firm* — Dinsmore & Shohl LLP

(57) ABSTRACT

The invention relates to an impeller receptacle, in particular for an impeller of a fan, comprising at least one rotationally symmetrical body. The rotationally symmetrical body has a first end face, a second end face and a lateral face, wherein at least one radial bore extends radially from the lateral face into the rotationally symmetrical body and an assembly recess extends from the first end face into the radial bore. A detent ball having a ball diameter and a spring are arranged in the at least one radial bore, wherein the detent ball can be pressed radially outwards by means of the spring. The radial bore has at least one first, inner radial bore diameter and a second, outer radial bore diameter, the second, outer radial bore diameter being smaller than the ball diameter.

8 Claims, 4 Drawing Sheets

(51) Int. Cl.
*F16D 1/08* (2006.01)
*F16D 1/116* (2006.01)
*F24C 15/20* (2006.01)

(56) References Cited

FOREIGN PATENT DOCUMENTS

DE 102015218612 B3 * 12/2016 ............. F04D 25/02
WO WO-2019210975 A1 * 11/2019 ........... F04D 29/263

OTHER PUBLICATIONS

Machine translation of CN 110006082, Li, Ying-Ju, published Jul. 12, 2019 (Year: 2019).*
Machine translation of DE 102015218612, Berling, Udo, published Dec. 1, 2016 (Year: 2016).*
International Search Report and Written opinion dated Mar. 10, 2021 pertaining to PCT Application No. PCT/EP2020/084141 filed Dec. 1, 2020.

* cited by examiner

IMPELLER RECEPTACLE

CROSS-REFERENCE TO RELATED APPLICATIONS

This application is the U.S. national stage of PCT/EP2020/084141 filed Dec. 1, 2020, which claims priority of German patent application 102019132607.9 filed Dec. 2, 2019, both of which are hereby incorporated by reference in their entirety.

FIELD OF THE INVENTION

The invention relates to an impeller mount, in particular an impeller mount of a suction device for cooking vapors on a cooking area, a method for installing the impeller mount, an impeller, in particular for a radial fan of a suction device, a suction device in particular for cooking vapors on a cooking area, and a use of the impeller holder for receiving the impeller and using the suction device for cooking vapors, especially on a cooking area.

BACKGROUND OF THE INVENTION

From the prior art are impeller mounts for fans, especially fans for suction devices from for cooking vapors on cooking places, well known.

The object of the invention is to provide an improved impeller mount and an improved impeller with an impeller mount. In particular, it is the object of the invention to provide a wheel mount that can hold a wheel with high precision, preferably with lower noise emissions and more preferably with better synchronization behavior than known from the prior art. A further preferred object of the invention is to provide a wheel mount that is easy to assemble and disassemble. It is also an object of the invention to provide a method for installing a wheel mount.

SUMMARY OF THE INVENTION

The object is achieved according to the invention by means of an impeller mount, in particular for accommodating an impeller for a fan impeller of a suction device for cooking vapors, comprising at least one rotationally symmetrical body, the rotationally symmetrical body comprising a first end face, a second end face and a lateral surface, with at least one radial bore starting from the lateral surface radially into the rotationally symmetrical body and a mounting recess extends from the first end face into the radial bore, with a locking ball with a ball diameter and a spring being arranged in the at least one radial bore, the locking ball being moved radially by means of the spring can be pressed outside, the radial bore at least comprising a first, inner radial bore diameter and a second, outer radial bore diameter, wherein the second, outer radial bore diameter is smaller than the ball diameter. Furthermore, the object is achieved according to the invention by means of a method for assembling a wheel mount, with the steps: providing a rotationally symmetrical body comprising a first end face, a second end face, a lateral surface, at least one radial bore and at least one mounting recess, the radial bore extending radially from the lateral surface into the rotationally symmetrical body and the mounting recess extending from the first face extends into the radial bore, inserting a locking ball through the assembly recess into the radial bore, Inserting a spring through the mounting recess into the radial bore in such a way that the spring presses the locking ball radially outwards.

Furthermore, the object is achieved according to the invention by using a running wheel mount for latching and non-rotatable mounting of a running wheel. An impeller mount, in particular for an impeller of a fan, comprising at least one rotationally symmetrical body is proposed. The rotationally symmetrical body has a first end face, a second end face and a lateral surface, with at least one radial bore extending radially from the lateral surface into the rotational symmetrical body extends and a mounting recess of the first surface in the face extends into the radial bore. A locking ball with a ball diameter and a spring are arranged in the at least one radial bore, the locking ball being able to be pressed radially outwards by means of the spring. The radial bore has at least a first, inner radial bore diameter and a second, outer radial bore diameter, wherein the second, outer radial bore diameter is smaller than the ball diameter.

The proposed impeller mount advantageously has a high level of precision when mounting the impeller. The second, outer radial bore diameter is preferably essentially the same for all radial bores. More preferably, the locking balls protrude, in particular limited by the second, outer radial bore diameter, essentially the same distance beyond the lateral surface of the rotationally symmetrical body. In particular, because the locking balls protrude essentially the same distance beyond the lateral surface of the rotationally symmetrical body, centering of the impeller on the impeller mount is much more precise than in the case of impeller mounts known from the prior art. In particular, the proposed impeller mount can advantageously be used to arrange the impeller so precisely centered on the impeller mount that synchronous operation and noise emission of the impeller are positively influenced. Especially preferred when using the proposed impeller mount for a radial fan, an imbalance of the fan wheel can be essentially avoided by the precise mounting. This has a positive effect on reducing noise emissions and synchronization of the fan wheel. In particular, mounting to the impeller mounts known from the prior art is advantageously simplified by the proposed impeller mount. Advantageously, the locking ball cannot fall out of the radial bore before or during assembly, since the second radial bore diameter is smaller than the ball diameter.

The impeller mount has a rotationally symmetrical body that is preferably cylindrical, more preferably circular-cylindrical. The rotationally symmetrical body is preferably an essentially cylindrical body, which comprises an edge with a radius or a phase at least on one side. Furthermore, in one embodiment seen that the rotationally symmetrical body includes at least one conical section.

The term "substantially" indicates a tolerance range that is acceptable to the person skilled in the art from an economic and technical point of view, so that the corresponding feature can still be recognized as such or implemented.

In one configuration, a maximum diameter of the rotationally symmetrical body is greater than its length. Preference is given to a maximum diameter of the rotationally symmetrical body for receiving impellers z between 150 and 250 mm in diameter, about 40 mm to about 60 mm, preferably about 50 mm to about 52 mm, more preferably about 50.4 mm. The length of the rotationally symmetrical body is preferably about 10 mm to about 20 mm, preferably about 15 mm to about 16 mm, more preferably about 15.7 mm. In the case of deviating impeller diameter dimensions, the dimensions of the rotationally symmetrical receiving body are preferably to be adjusted accordingly.

If the term "approximately" is used within the context of the invention in connection with values or value ranges, this is to be understood as meaning a tolerance range that the person skilled in the art in this field considers to be normal, in particular a tolerance range of ±20%, preferably ±10%, more preferably ±5% provided. Insofar as different value ranges, for example preferred and more preferred value ranges, are specified in the present invention, the lower and upper limits of the different value ranges can be combined with one another.

The rotationally symmetrical body has a lateral surface. At least one radial bore is arranged in the rotationally symmetrical body, starting from the lateral surface. A plurality of radial bores is preferably provided. In one embodiment, it is provided that a plurality of radial bores are distributed, in particular evenly, on the circumference of the lateral surface. About 2 to about 20 radial bores are preferably provided, more preferably about 3 to about 12, more preferably about 10 radial bores. The at least one radial bore is preferably introduced radially into the rotationally symmetrical body, starting from the lateral surface. In one embodiment, it is provided that the radial bore diameter changes continuously and/or discretely over a length of the radial bore. The diameter preferably changes discretely once or several times over its length. In one embodiment, it is provided that the diameter of the radial bore changes continuously over its length. In one embodiment, it is provided that the radial bore is designed conically at least in sections. The radial bore diameter preferably changes precisely once, continuously or discretely, from the first, inner radial bore diameter to the second, outer radial bore diameter. The radial bore diameter preferably decreases steadily and/or discretely radially outward. The second, outer radial bore diameter is preferably assigned to the lateral surface of the rotationally symmetrical body. Furthermore, a section with the second, outer radial bore diameter has a length that is smaller than the diameter of the detent ball, more preferably about 0.1 mm to about 1 mm. In a further feature, it is provided that the second, outer radial bore diameter and the radial length of the section with the second, outer radial bore diameter are matched to the detent ball in such a way that the detent ball is about 0.1 times to about 0.4 times, preferably about 0.3 times to 0.4 times the ball diameter and protrudes radially beyond the lateral surface.

The second, outer radial bore diameter is preferably smaller than the first, inner radial bore diameter. More preferably, the first, inner radial bore diameter is larger than the ball diameter. The second, outer radial bore diameter is smaller than the ball diameter.

In a further embodiment it is provided that the at least one radial bore comprises a first section which encompasses the first, inner radial bore diameter and a second section which directly borders the first section and comprises the second, outer radial bore diameter. In particular, a shoulder is formed at the transition from the first section to the second section. In a further embodiment it is provided that the transition from the first section to the second section is continuous at least in a transition area. It is preferably provided that the second section is assigned to the lateral surface. It is further preferably provided that the first section is located radially on the inside and the second section is located radially on the outside. In one embodiment, a recess is formed between the section with the second, outer radial bore diameter and the section with the first, inner radial bore diameter, with the detent ball abutting against the recess in one embodiment. In one embodiment, a continuous transition is formed between the section with the second, outer radial bore diameter and the section with the first, inner radial bore diameter, with the arresting ball in one embodiment abutting against a transition area.

In one embodiment, it is provided that the at least one radial bore accommodates the locking ball. More preferably, at least in sections, the radial bore has a diameter that corresponds to the ball diameter, preferably with a tolerance of approximately ±0.02 mm to approximately ±0.04 mm. In one embodiment, it is provided that the first radial bore diameter is larger than the ball diameter, in particular at the operating temperature of the impeller, preferably at about 10° C. to about 50° C. The locking ball is advantageously movable within at least the section in which the radial bore diameter is greater than the ball diameter.

The at least one radial bore preferably has a bore bottom, the radial bore more preferably being designed as a blind hole. In one embodiment, it is provided that the bottom of the radial bore forms a counter bearing for the spring.

A spring is arranged in the at least one radial bore. The spring is preferably arranged in a section with the first, inner radial bore diameter. Before the spring is given radially inside and the locking ball is arranged radially outside in the radial bore. In one embodiment, it is provided that the spring is arranged in the radial bore in such a way that it introduces a force into the locking ball that is directed radially outward. The locking ball can preferably be pressed radially outwards by means of the spring. More preferably, the spring presses the detent ball against a portion of the radial bore having a second, outer radial bore diameter. More preferred is the detent ball between the spring and the section with the second, outer radial bore diameter fixed. Advantageously, the locking ball is pressed radially outwards by the spring essentially far enough that at least one spherical cap of the locking ball protrudes beyond the lateral surface of the rotationally asymmetric body. Advantageously, the locking ball cannot fall out, since the second, outer radial bore diameter is smaller than the ball diameter and thus limits the radial outward movement of the locking ball.

Furthermore advantageously, by means of a radially acting force on the locking ball, the locking ball can be displaced radially inwards into the radial bore, in particular against a spring force. In particular, it is provided that the length of the spring is dimensioned in such a way that it presses the locking ball under pre-stress against the section with the second, outer radial bore diameter. In order to achieve spring preloading of the spring, one embodiment provides that the first and/or second diameter is manufactured with a tolerance of approximately 0.005 mm to approximately 0.002 mm, preferably approximately 0.001 mm.

In one embodiment, it is provided that radially outer points of the locking balls are arranged on a spherical circle. The ball circle forms the maximum circumference of the impeller, especially when the locking balls are not loaded by a radially inward force. The diameter of the spherical circle is preferably larger than the diameter of the rotationally symmetrical body. In particular, the diameter of the spherical circle depends on how far the locking balls are pushed out of the radial bores or how far the spherical caps of the locking balls protrude beyond the lateral surface of the rotationally asymmetric body.

The rotationally symmetrical body preferably has a first side and an opposite second side. The rotationally symmetrical body has a first end face, which is preferably assigned to the first side, and a second end face, which is preferably assigned to the second side. The first end face is preferably a side that can be turned towards a motor of a fan and the second end face is a side that faces away from the motor. The first face and the second face are formed opposite to each other. The end faces preferably border on the lateral surface of the rotationally symmetrical body. In one embodiment, the end faces border on an edge of the lateral surface, which can be designed as a radius or chamfer, for example. Lists of examples are not to be regarded as conclusive within the meaning of the invention, but can be supplemented within the scope of general specialist knowledge.

In one embodiment, it is provided that the impeller mount comprises at least one assembly recess, which extends from the first end face into the radial bore. The mounting recess is, for example, a recess configured as a bore, which extends from the first end face in the direction of a longitudinal axis of the impeller receptacle in the direction of the radial bore, preferably opening into it. More preferably, the mounting recess extends right up to the radial bore. A diameter of the mounting recess is preferably larger than the ball diameter. More preferably, the diameter of the mounting recess is approximately as large as the first, inner radial bore diameter. In one embodiment it is provided that the locking ball can be introduced into the radial bore via the mounting recess. More preferably, the locking ball can be introduced into the radial bore by means of the mounting recess. In one embodiment it is provided that the spring can be inserted into the radial bore via the mounting recess. More preferably, the spring can be introduced into the radial bore hole by means of the assembly recess. The advantage of the mounting recess is that the locking ball does not have to be pushed through the second, outer radial bore diameter, which would widen it unintentionally. Also, the second radial bore diameter does not have to be produced, for example, by means of a generative manufacturing process after the spring and the locking ball have been introduced. The locking ball and the spring can be quickly and easily placed through the mounting recess in the radial bore and are then held captive in it.

In one embodiment, it is provided that the impeller mount includes a motor shaft mount. The motor shaft mount is preferably arranged centrally in the impeller mount. The motor shaft receptacle is preferably a recess, preferably a bore and/or a milling, into which, more preferably, a motor shaft, for example a fan, can be introduced. The motor shaft mount preferably extends from the first end face to the second end face. In a further embodiment, the motor shaft includes a blind hole that extends from the first end face or the second end face in the longitudinal direction of the impeller. In a further embodiment, the motor shaft mount has a first diameter and a second diameter, with the first diameter being smaller than the second diameter. The second diameter is preferably associated with the first end face or the second end face.

In an exemplary configuration of the impeller mount, this has a rotationally symmetrical body. The rotationally symmetrical body has a height and a diameter. A first end face is on a first side of the rotationally symmetrical body and a second end face is arranged on an opposite second side. The end faces border on a lateral surface. The rotationally symmetrical body has a cylindrical section and a conical section, the cylindrical section being assigned to the first side and the conical section to the second side.

The rotationally symmetrical body has, for example, a plurality, for about 10, radial bores. Starting from the lateral surface, in particular in the cylindrical section, these extend radially into the rotationally symmetrical body. Starting from the second end face, for example, a motor shaft receptacle extends through the rotationally symmetrical body in a longitudinal direction.

The individual radial bores are designed as blind holes, for example, and each have a bore bottom. Locking balls are arranged in the radial bores. Furthermore, springs are introduced into the exemplary radial bores, which are arranged radially on the inside of the locking ball. The springs are supported against the respective drilling base of the radial bore. In addition, mounting recesses open into the radial bores, each extending from the first side into the radial bores. Through this, the locking balls and springs can be introduced into the respective radial bore.

The locking balls are, for example, pressed radially outwards by the springs, so that they protrude beyond the lateral surface of the rotationally symmetrical body. The radially outermost points of the locking balls lie essentially on a spherical circle, which at the same time represents the maximum extent of the impeller mount. A ball diameter of the locking balls is smaller than a first, inner radial bore diameter of the radial bore. At the same time, the ball diameter is larger than a second, outer diameter of the radial bore, which is associated with the outer surface of the rotationally symmetrical body. The ball is thus pressed by the spring against the section of the radial bore with the second, outer diameter. The section of the radial bore with the second, outer diameter thus prevents the locking ball from falling out of the radial bore. Furthermore, this arrangement ensures that a spherical cap of the locking ball protrudes beyond the lateral surface of the rotationally symmetrical body.

Furthermore, an impeller with an impeller mount as described above is proposed. The impeller has a receiving recess that includes a receiving recess diameter that is at least partially larger than a maximum diameter of the impeller mount. An inner wall of the receiving recess has at least one undercut into which at least one locking ball of the impeller seat engages.

The impeller preferably includes a first side and a second side, with the first side opposite the second side. In one embodiment, the first side of the impeller has a thread, in particular for receiving a handle. In one embodiment, the receiving recess is assigned to the second side. This preferably extends starting from the second side in the longitudinal direction of the impeller. In one configuration, the receiving recess has a recess wall which is, in particular, rotationally symmetrical. More preferably, the diameter of the receiving recess changes in one configuration in the longitudinal direction. The receiving recess preferably has an undercut. The undercut is preferably formed by narrowing the wall of the recess. More preferably, the constriction is a section of the receiving recess with a first diameter. In a further embodiment, the receiving recess has a fitting section with a second diameter, which is arranged behind the constriction, starting from the second side. In one embodiment, the second diameter is larger than the first diameter. In particular, by formed the fitting section behind the constriction an undercut, which is preferably ring-shaped circumferentially. In one configuration, the fitting section is designed as at least one at least partially circumferential groove. In one embodiment, starting from the second side, an insertion section is provided in front of the constriction, which is preferably conical and more preferably opens or widens towards the second side.

The first diameter is preferably larger than the diameter of the rotationally symmetrical body. A clearance fit or transition fit is preferably provided between the rotationally symmetrical body and the constriction. More preferably, the rotationally symmetrical body is manufactured with an accuracy of about 0.05 mm to about 0.2 mm, preferably about 0.1 mm, undersize for narrowing. More preferably, the arresting balls of the impeller mount can be pressed into the radial bores when passing the constriction during assembly. More preferably, after passing the constriction, the locking balls are partially pushed out again by the springs in the radial bore, so that they jump into the undercut behind the constriction.

In one embodiment it is provided that a fitting dimension between the rotationally symmetrical body and the receiving recess, in particular the constriction and/or the fitting section, is preferably selected as a function of the diameter of the rotationally symmetrical body. A loose fit is preferably provided between the rotationally symmetrical body and the receiving recess in the fitting section. In particular, the fitting dimension between the constriction and the rotationally symmetrical body or between the fitting section and the rotationally symmetrical body is selected in such a way that the impeller mount can be fitted into the impeller by hand and, more preferably, a secure fit is ensured after assembly. In a further embodiment it is provided that an inner diameter of the receiving recess, in particular of the fitting section, is adapted to the diameter of the spherical circle. The inner diameter of the fitting section is preferably approximately equal to the diameter of the spherical circle of the impeller mount. Advantageously, the locking balls substantially exactly touch the inner radius of the receptacle in the mating section, preferably without being pressed into the radial bore substantially against the spring force. The rotationally symmetrical one is more preferred. A body made with an accuracy of about 0.05 mm to about 0.2 mm, preferably about 0.1 mm, undersized for passport recording. Provision is particularly preferably made for the locking balls to be pressed against the inner wall in the region of the fitting section, more preferably into the undercut, in particular by the spring force, such that a frictional connection is produced between the impeller mount and impeller. The locking balls are preferably located directly behind the constriction in the undercut on the inner wall of the receiving recess.

In an exemplary configuration of the impeller, it has a thread for receiving a handle. A receiving opening is associated with a second side. The receiving opening is designed in such a way that it can receive the impeller mount. In particular, the receiving opening has an inner wall that is profiled and divides the receiving recess into several sections. The receiving opening has an insertion section which is conical and widens towards the second side. Furthermore, the receiving opening has a constriction. Furthermore, the receiving opening has a fitting section that has a larger diameter than the constriction, which is not shown for the sake of clarity. This forms an undercut. If the impeller mount is inserted into the impeller, its locking balls are pressed radially inwards into the radial bore when passing the constriction. When the impeller is inserted into the fitting section, the springs partially push the locking balls out again, so that they lie against the inner wall of the receiving recess.

Furthermore, a method for assembling an impeller mount described above is proposed, with the steps: providing a rotationally symmetrical body comprising a first end face, a second end face, a lateral surface, at least one radial bore and at least one mounting recess, the radial bore extending radially from the lateral surface into the rotationally symmetrical body and the mounting recess extending from the first end face into the radial bore into it stretches, inserting a locking ball through the mounting recess into the radial bore, inserting a spring through the mounting recess into the radial bore in such a way that the spring presses the locking ball radially outwards.

If, in one embodiment, the impeller receptacle comprises a plurality of radial bores, a locking ball and a spring are preferably introduced into each individual radial bore via the respective mounting recess.

In one embodiment, it is provided that the impeller mount described above is mounted with an impeller, preferably as described above. Here, the impeller mount is guided into the mounting recess, with the locking balls being pressed radially inwards by the constriction into the radial bore. After the detent have passed the constriction, they are pressed radially outwards by the springs in the radial bores, so that they jump behind the undercut. After they have been guided into the fitting section, the locking balls protrude beyond the outer surface of the rotationally symmetrical body in such a way that they touch the inner wall of the receiving recess.

Furthermore, a suction device includes at least comprising a fan wheel and a motor, the fan wheel being coupled to the motor by means of a wheel described above with a wheel mount described above. The fan wheel is preferably designed as a radial fan wheel.

An example suction device includes a fan wheel and a motor. The fan wheel is coupled to the motor by the impeller with the impeller mount, for example. A motor shaft of the motor protrudes, for example, into the motor shaft mount of the impeller mount and is connected to it in particular by friction. The impeller mount is inserted into the impeller, with the locking balls being pressed radially outwards from the radial bores by springs and, for example, engaging in an undercut of the impeller. Furthermore, the use of a running wheel mount as described above for latching and non-rotatable mounting of a running wheel is proposed. Furthermore, the use of a suction device for sucking off cooking vapors is proposed.

Further advantageous configurations emerge from the following drawings. However, the developments presented there are not to be interpreted in a restrictive manner; rather, the features described there can be combined with one another and with the features described above to form further refinements. Furthermore, it should be noted that the reference symbols given in the description of the figures do not limit the scope of protection of the present invention, but only refer to the exemplary embodiments shown in the figures. Identical parts or parts with the same function have the same reference symbols below.

DETAILED DESCRIPTION OF THE PREFERRED EMBODIMENTS

Figure 1:
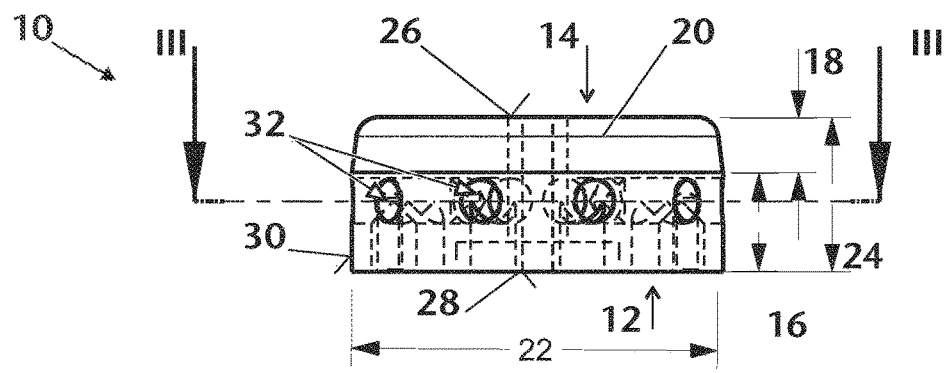
FIG. 1 is a wheel mount in a side view.

FIG. 1 shows a wheel mount 10 in a side view. The impeller mount 10 has a rotationally symmetrical body 20.

This has a height 24 and a diameter 22 on a first end face 28 is arranged on a first side 12 of the rotationally symmetrical body 20 and a second end face 26 is arranged on an opposite second side 14. The end faces 26, 28 border on a lateral surface 30. The rotationally symmetric body 20 has a cylindrical portion 16 and a conical portion 18, wherein the cylindrical portion 16 of the first side 12 and the conical portion 18 of the second side 14 is associated. The rotationally symmetrical body 20 has a plurality, for example about 10, radial bores 32 on starting from the lateral surface 30, in particular in the cylindrical section 16, these extend radially into the rotationally symmetrical body 20.

Indicated in dashed lines are hidden edges of the radial bores 32 and other recesses, which are not further identified for the sake of clarity.

Figure 2:
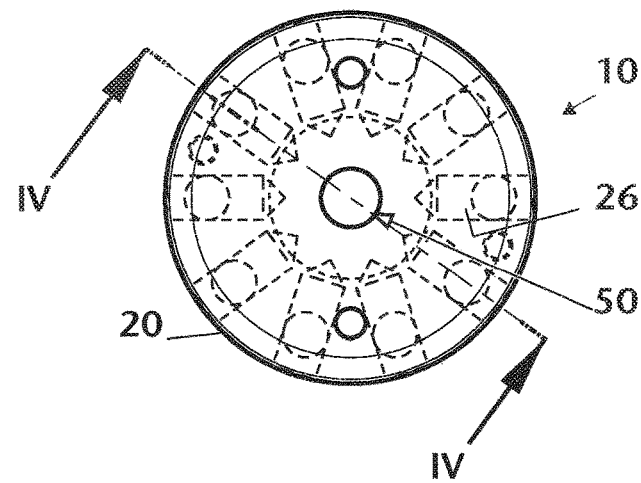
FIG. 2 is a impeller mount from FIG. 1 in a view of a second side.

FIG. 2 shows a top view of the second side 14, which is indicated in FIG. 1, of the rotationally symmetrical body 20 of the impeller mount 10. Starting from the second end face 26, a motor shaft receptacle 50 extends through the rotationally symmetrical body 20 in a longitudinal direction (not designated).

Indicated in dashed lines are hidden edges of the radial bores 32 and the mounting recess and other recesses, which for the sake of clarity are not designated further.

Figure 3:
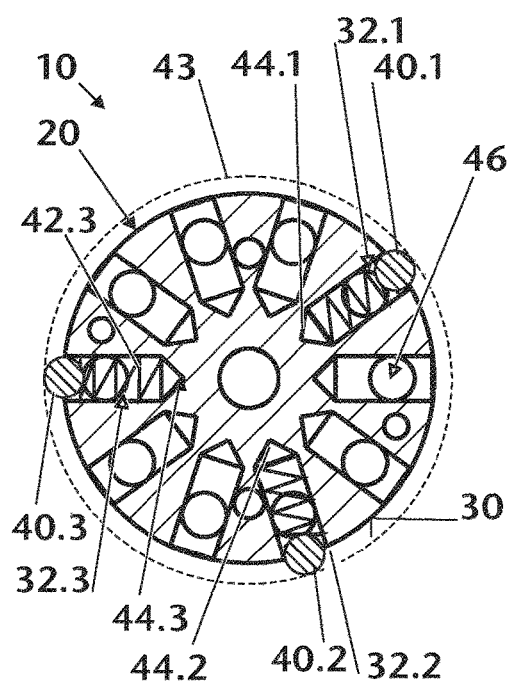
FIG. 3 is an impeller mount from FIG. 1 in sectional view III-III from FIG. 1.

FIG. 3 shows a cross section III-III from FIG. 1. The individual radial bores 32.1, 32.2, 32.3, are not all labeled for the sake of clarity, are designed as blind holes and each have a drill bottom 44.1, 44.2, 44.3, which are not all named for the sake of clarity. Examples are locking balls in three radial bores 32.1, 32.2, 32.3, 40.1, 40.2, 40.3 arranged. For the sake of clarity, the remaining locking balls 40.4 to 40.10 in the undesignated radial bores 32.4 to 32.10 have not been shown. Furthermore, in the exemplary radial bores 32.1, 32.2, 32.3 springs 42.1, 42.2, 42.3 introduced, which are arranged radially inwards to the locking ball 40.1, 40.2, 40.3. The springs 42.1, 42.2, 42.3 are supported against the respective bottom of the hole 44.1, 44.2, 44.3 of the radial bore 42.1, 42.2, 42.3. In addition, mounting recesses 46 open into the radial bores 42.1, 42.2, 42.3, not all of which are labeled for the sake of clarity. Through these are the detent balls 40.1, 40.2, 40.3 and springs 42.1, 42.2, 42.3 can be introduced into the respective radial bore 32.1, 32.2, 32.3.

The locking balls 40.1 to 40.3 are pressed radially outwards by the springs 42.1 to 42.3, so that they extend beyond the lateral surface 30 of the rotationally symmetrical body 20 protrude. The radially outermost points of the locking balls 40.1 to 40.3 lie essentially on a spherical circle 43, which is the maximum circumference of the impeller receptacle 10 at the same time.

Figure 4:
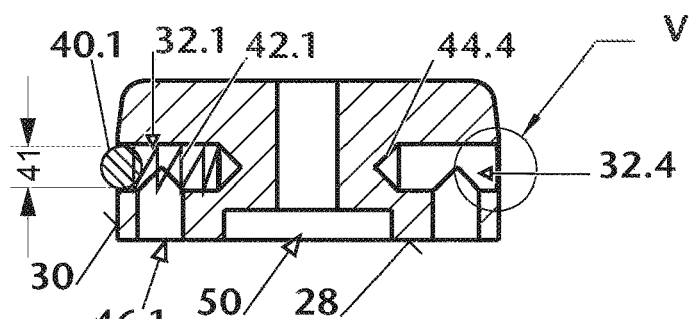
FIG. 4 is a longitudinal section IV-IV of the impeller mount from FIG. 2.
Figure 5:
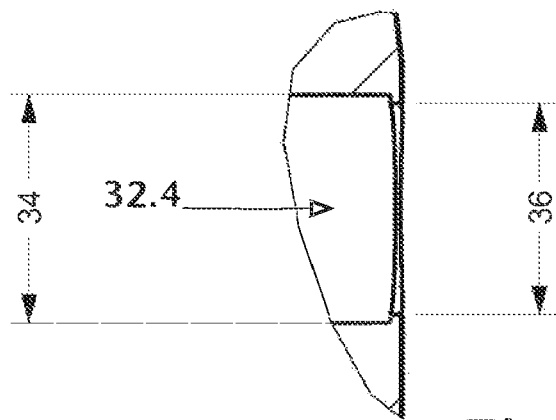
FIG. 5 is a detail view from FIG. 4.

FIG. 4 shows a longitudinal section IV-IV from FIG. 2. By way of example, a spring 42.1 and a locking ball 40.1 are arranged in one of the radial bores 32.1, which is accessible via the assembly recess 46.1. A ball diameter 41 is smaller than a first, inner radial bore diameter 34 of the radial bore 32.4 shown in the detailed view V in FIG. 4. The configuration of the radial bore 32.4 shown as an example in FIG. 5 is essentially identical to the respective configuration of the other radial bores 32.1 to 32.3 and 32.5 to 32.10. At the same time, the ball diameter 41, which is essentially the same for all locking balls, is larger than a second, outer radial bore diameter 36 of the radial bore 32.4 shown in the detailed view V in FIG. 4. The locking ball 40.1 is thus pressed by the spring 42.1 against the non-designated section of the radial bore 32.1 with the second, outer radial bore diameter 36. The section of the radial bore 32.1 with the second, outer radial bore diameter 36 thus prevents the locking ball 40.1 from falling out of the radial bore 32.1.

Furthermore, this arrangement ensures that a spherical cap of the locking ball 40.1 protrudes beyond the lateral surface 30 of the rotationally symmetrical body 20. The motor shaft mount 50 can also be seen in FIG. 4 and also shows that a recess is formed between the section with the second, outer radial bore diameter 36 and the section with the first, inner radial bore diameter 34, against which the locking ball (not shown) abuts, illustrated in FIG. 5.

In a further embodiment, a continuous transition can be provided between the section with the second, outer radial bore diameter 36 and the section with the first, inner radial bore diameter 34. In particular, the section with the second, outer radial bore diameter 36 and the section from the first, inner radial bore diameter 34 can be designed as described in the general description.

Figure 6:
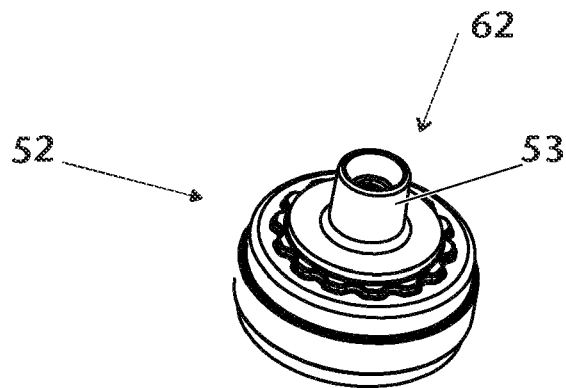
FIG. 6 is a perspective view of an impeller.

FIG. 6 shows an impeller 52 in a perspective view with a thread 53 for receiving a handle on a first side 62.

Figure 7:
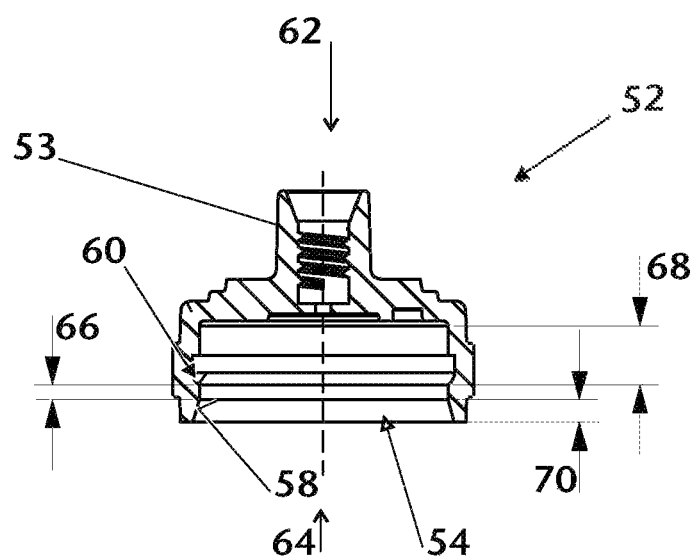
FIG. 7 is a section view of the impeller from FIG. 6.

FIG. 7 shows a longitudinal section of the impeller 52 from FIG. 6. This has a thread 53 for receiving a handle on the first side 62. A receiving opening 54 is associated with a second side 64. The receiving opening 54 is designed in such a way that it can receive the impeller seat 10. In particular, the receiving opening 54 has an inner wall 58 which is profiled and divides the receiving recess 54 into several sections. The receiving opening 54 has an insertion section 70, which is conical and widens towards the second side 64. Furthermore, the receiving opening 54 has a constriction 66. Furthermore, the receiving opening has a fitting section 68, which has a larger diameter, which is not shown for the sake of clarity, than the constriction 66. As a result, an undercut 60 is formed. If the impeller mount 10 is inserted into the impeller 52, its locking balls 40 are pressed radially inwardly into the radial bore when passing through the constriction 66. If the impeller 52 is inserted into the fitting section 68, the locking balls 40 are partially pushed out again by the springs 42, so that they lie against the inner wall 58 of the receiving recess 54.

Figure 8:
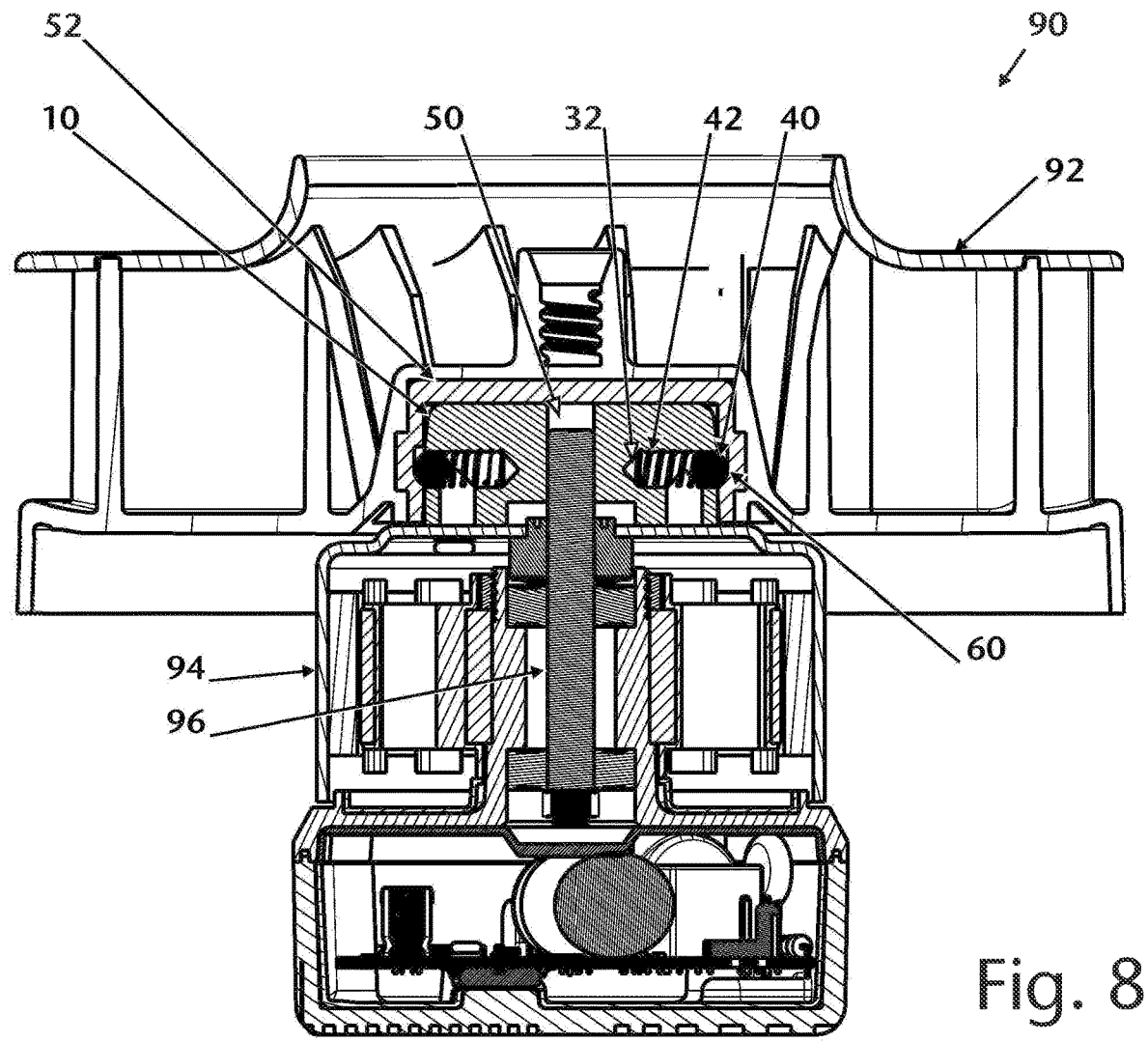
FIG. 8 is a sectional view of a suction device.

FIG. 8 shows a cross section of a suction device 90 comprising a fan wheel 92 and a motor 94. The fan wheel 92 is coupled to the motor 94 by means of the impeller 52 with the impeller mount 10. A motor shaft 96 of the motor 94 protrudes into the motor shaft receptacle 50 of the impeller 10 and is connected to this particular friction. The impeller mount 10 is inserted into the impeller 52, the locking balls 60 being pressed radially outwards from the radial bores 32 by springs 42 and engaging in an undercut 60 of the impeller 52.

With the impeller mount 10 described, assembly in the impeller 52 can be significantly simplified, since the locking balls 40 are arranged captively in the radial bores 32. Furthermore, the spherical circle 43 formed by the locking balls 40 is so precise that the mounted impeller 52 runs more smoothly than is known from the prior art.

The invention claimed is:

1. An impeller comprising:
   a receiving recess having a receiving recess diameter, an inner wall of the receiving recess has at least one undercut, wherein the receiving recess is configured to receive an impeller mount comprising:
      at least one rotationally symmetrical body, the at least one rotationally symmetrical body having a first end face, a second end face and a lateral surface, with at least one radial bore starting from the lateral surface radially into the at least one rotationally symmetrical body and a mounting recess extends from the first end face into the at least one radial bore, with a locking ball in the at least one radial bore with a ball diameter and a spring, the locking ball configured to be pressed radially outwards by a spring force of the spring to define a spherical circle having a diameter, the spherical circle forming a maximum circumference of the impeller mount, the at least one radial bore having at least a first, inner radial bore diameter and a second, outer radial bore diameter, wherein the second, outer radial bore diameter is smaller than the ball diameter, wherein the inner wall of the receiving recess is larger than a diameter of the at least one rotationally symmetrical body of the impeller mount, the inner wall of the receiving recess including a fitting section and a constriction section, the inner wall of the fitting section having a second diameter and the inner wall of the constriction section having a third diameter, the second diameter of the inner wall of fitting section being approximately equal to the diameter of the spherical circle of the impeller mount, the third diameter of the inner wall of the constriction section increasing along a section from the constriction section towards the fitting section to define the at least one undercut;

wherein when the impeller mount is received within the fitting section of the receiving recess, the locking ball is pressed radially outward such that at least a portion of the locking ball is in contact with the inner wall of the receiving recess to produce a frictional connection between the impeller mount and the impeller.

2. The impeller according to claim 1, wherein at least one of the first inner radial bore diameter and the second outer radial bore diameter changes continuously and/or discretely over a length of the at least one radial bore.

3. The impeller according to claim 1, wherein the first inner radial bore diameter is larger than the ball diameter.

4. The impeller according to claim 1, wherein a bore base of the at least one radial bore forms a counter bearing for the spring.

5. The impeller according to claim 1, wherein the locking ball is introduced into the at least one radial bore via the mounting recess.

6. The impeller according to claim 1, wherein the at least one radial bore has a first section comprising the first inner radial bore diameter and a second section immediately adjacent to the first section and comprising the second outer radial bore diameter.

7. A method for assembling the impeller according to claim 1 comprising the steps of:

providing the at least one rotationally symmetrical body comprising the first end face, the second end face, the lateral surface, the at least one radial bore and the mounting recess, wherein the at least one radial bore starting from the lateral surface extends radially into the at least one rotationally symmetrical body and the mounting recess extends from the first end face into the at least one radial bore, inserting the locking ball through the mounting recess into the at least one radial bore, introducing the spring through the mounting recess into the at least one radial bore in such a way that the spring presses the locking ball radially outwards.

8. A suction device for cooking fumes at least comprising:

a fan wheel and a motor, the fan wheel having a wheel with an impeller mount that is coupled to the motor, the impeller mount received by an impeller comprising:

a receiving recess having a receiving recess diameter, an inner wall of the receiving recess has at least one undercut, wherein the receiving recess configured to receive the impeller mount comprising:

at least one rotationally symmetrical body, the at least one rotationally symmetrical body having a first end face, a second end face and a lateral surface, with at least one radial bore starting from the lateral surface radially into the at least one rotationally symmetrical body and a mounting recess extends from the first end face into the at least one radial bore, with a locking ball in the at least one radial bore with a ball diameter and a spring, the locking ball configured to be pressed radially outwards by a spring force of the spring to define a spherical circle having a diameter, the spherical circle forming a maximum circumference of the impeller mount, the at least one radial bore having at least a first, inner radial bore diameter and a second, outer radial bore diameter, wherein the second, outer radial bore diameter is smaller than the ball diameter, wherein the inner wall of the receiving recess is larger than a diameter of the at least one rotationally symmetrical body of the impeller mount, the inner wall of the receiving recess including a fitting section and a constriction section, the inner wall of the fitting section having a second diameter and the inner wall of the constriction section having a third diameter, the second diameter of the fitting section being approximately equal to the diameter of the spherical circle of the impeller mount, the third diameter of the inner wall of the constriction section increasing along a section from the constriction section towards the fitting section to define the at least one undercut;

wherein when the impeller mount is received within the fitting section of the receiving recess, the locking ball is pressed radially outward such that at least a portion of the locking ball is in contact with the inner wall of the receiving recess to produce a frictional connection between the impeller mount and the impeller.

* * * * *